Sept. 1, 1936.   L. H. BROWNE   2,052,551
POWER BRAKE OPERATING MECHANISM
Filed Feb. 3, 1934   2 Sheets-Sheet 2
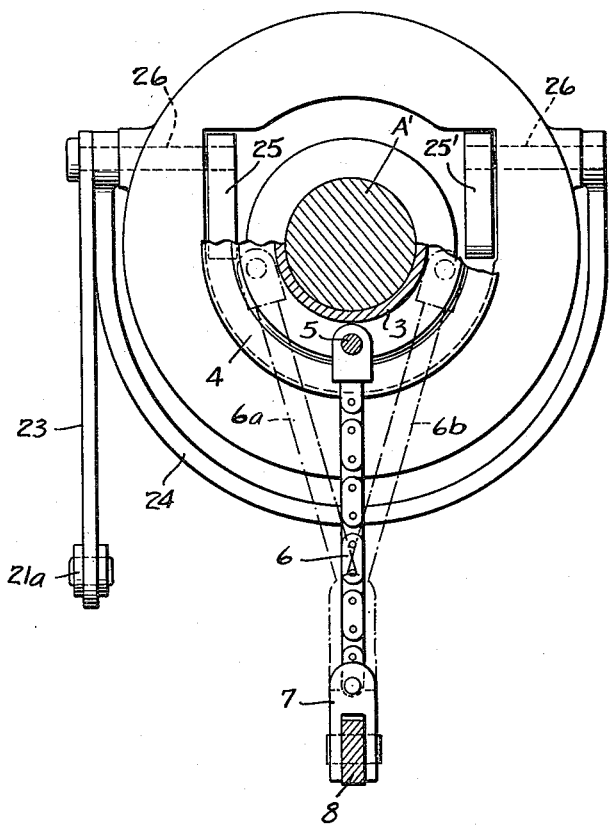
Fig. II.
INVENTOR
LINDSAY H. BROWNE
BY
ATTORNEY Patented Sept. 1, 1936

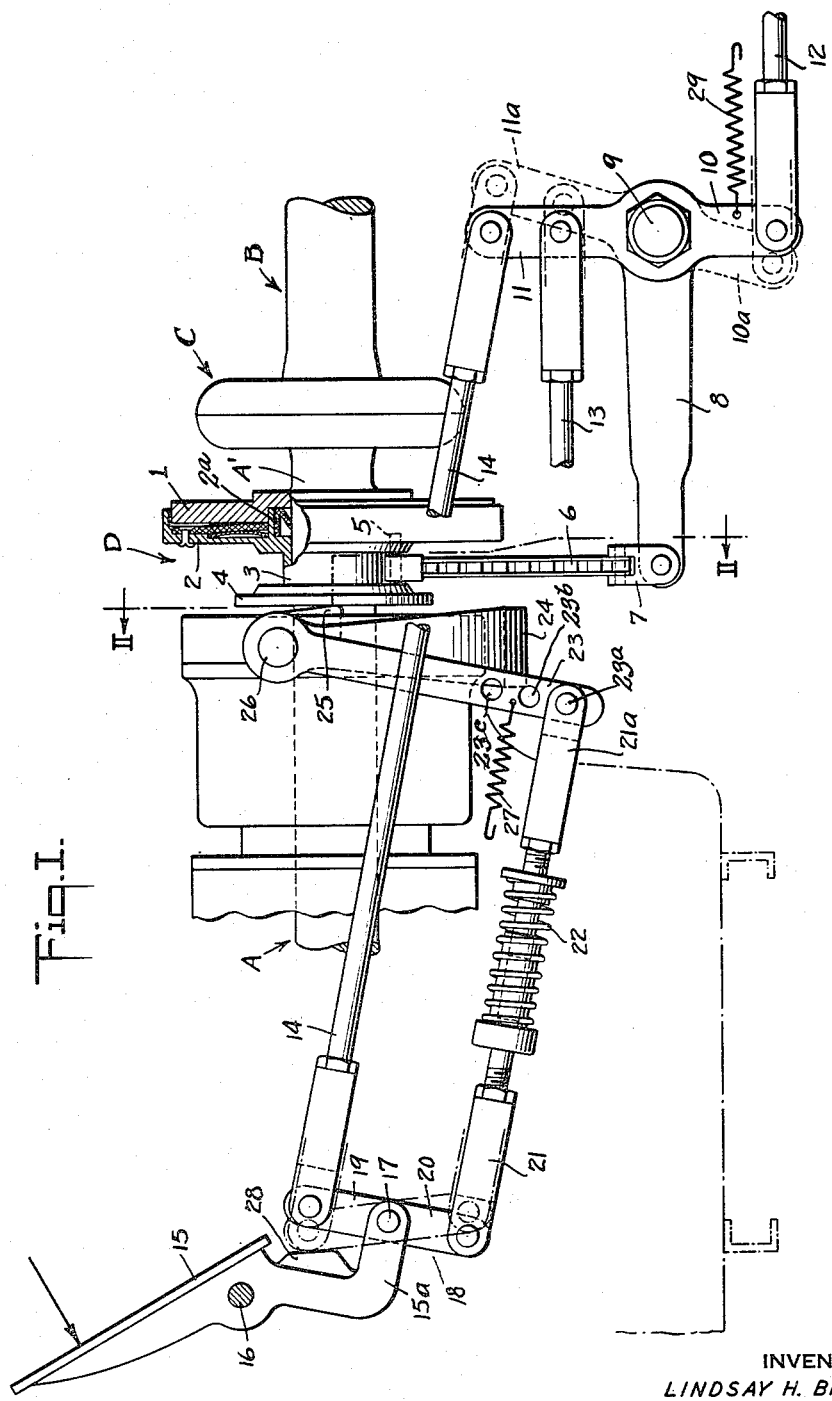

2,052,551

UNITED STATES PATENT OFFICE 2,052,551

POWER BRAKE OPERATING MECHANISM

Lindsay H. Browne, Rochester, N. Y., assignor to Josiah Anstice & Co. Inc., Rochester, N. Y., a corporation of New York Application February 3, 1934, Serial No. 709,581

10 Claims. (Cl. 188—140)

This invention relates to brake operating mechanism for motor cars. In particular it involves the voluntary application or setting into functioning of power brake mechanism, in order that the control or brake application may be most advantageously effected to assure ease of operation and particular features of regulation of the braking effect, as will hereinafter more particularly appear.

As a particular embodiment of my invention I have shown herewith a form of power brake unit and in combination therewith the brake-operating connections. From this embodiment of my construction, it will be noted that I provide a controllable action of the power brake without what is known as a fierce or sudden application, and I provide it with the exertion of very light pressure by the operator and relatively slight movement of the foot. The results are a cushioning effect—and in addition a "feel" on the part of the operator which assures his easy operation, that is the applying of the brakes and also the easy release of the brakes.

The ease of application as well as the ease of release involves the setting into action of the power brake, but subject to particular control, so that the multiplied power due to the power brake will be gently applied—and also gently released.

In accomplishing this, in a particular form, such as herein specifically described, I use a foot-treadle which may be so fulcrumed that the foot will be able to gently depress it and with slight pressure, while I may also use a treadle in the sense that it forms a base for the shoe permitting full ankle action for depression and raising. The approximate centre of pressure on the treadle is positioned with respect to the fulcrum and the opposite end of the operating lever in a ratio in the order of one to one, in comparison with the ordinary now standard foot-pedal for brake operation, which has a ratio of six or eight to one in order to provide ample multiplication of power at the pedal.

The treadle actuates a bridle which has linked to it one direct rod leading to the brake-actuating lever on the tortion bar connected with the brake-rigging, but it has primarily another link connected to the lever actuating the cams which throw the power brake into functioning. When the power brake starts to function it takes up the slack in the power brake lever connections and the slack in the brake-rigging, and thereafter the degree of application of braking power is a matter of pressure without relatively appreciable movement. This first action to cause the power brake unit to start functioning, when taking up the initial slack in the parts, turns the brake tortion bar so that it moves the direct link connection with the treadle and in so doing it moves the bridle link, and tends to release the initial pressure applied to the power brake actuating mechanism, but the treadle being in motion by the foot, it in turn takes up the slack of the operating linkage and progressively the foot then effects further pressure on the power brake actuating lever. Thus a gradual application of the power brake is assured by the "feel" on the operator's foot. Likewise should it be desired to make an emergency application of the brakes, the foot treadle can be pressed down its full amplitude of motion without delay so that simultaneous action results in instant application of the power brake to the maximum degree desired.

When releasing the brakes a reverse action occurs, namely, on relieving the pressure on the treadle, having a sufficient amplitude of motion to assure a proper "feel" the wheel brakes are gently released and when they reach a point that permits the tortion rod to be turned to provide for the usual slack in the rigging, the link directly connecting the treadle bridle is moved so that it forces the bridle in a direction that causes the power brake link to maintain its gentle functioning position until the operator voluntarily releases the treadle fully, in order that the power brake is fully released from functioning.

I have shown in this connection a power brake of very simple construction, substantially as heretofore shown and described in my co-pending patent application Serial No. 696,763. The application of such a power brake unit involves a very slight longitudinal motion in the direction of axis of the drive shaft, preferably by the pressure of cams, balanced on opposite sides of the face of a flange, and with any suitable means to retract the power unit from contact of its actuating clutch faces. I also provide for the retraction of the lever actuating the cams, and thereby provision is made for entirely clearing the power brake or its operating means from friction during idling, that is during the period when no brake application is desired, thus fully eliminating such friction and wear of parts.

In the particular embodiment of my power brake unit, as shown in this application, I use a single chain, which however may be a band or cable, depending from the power brake hub. This chain or the like is attached to a single lever on the brake rigging cross-bar or tortion-rod. In this manner the power brake provides tension on the connections either when the car is moving forward or when it is moving rearward. When the power brake unit is free the chain or the like hangs from the centre and the brake rigging pull-back springs acting through the cross-bar puts sufficient tension on the power brake lever so as to hold the chain in neutral position, which assures the power clutch being brought back to neutral position after each brake application. It is thus ready for forward or rearward braking, and in either application of the brakes there is a fractional revolution of the power brake hub with the initial contact of the clutch, thus bringing the chain connection with the hub to one side or the other where the continuing force of the power brake hub applies the force to the chain with the required leverage predetermined by the original design of the brake. The initial turn of the hub from neutral position moves the brake rigging against the pull-back springs to the point of the brake contacts, which are then in position for braking pressure due to the power brake moment.

The position of the operating linkage and the power brake unit and connections to the brake-rigging are all such as to be conveniently accommodated in the present day standard construction of cars. The oscillating or reciprocating parts are so positioned that they are well above the lowest level of the crankcase or engine case and supporting cross-members, so as not to interfere—nor to be interfered with in their proper functioning by any road obstacles.

The results accomplished by my construction are in one respect the use of a progressive treadle or pedal, which follows down upon light application and with ease to a gentle application of the brakes through the use of the power brake. In addition to which provision is made for emergency, and likewise provision is made to assure a means of applying the brakes even though connections might be broken that put the power brake out-of-functioning.

Particular advantages resulting from my construction also involve comparatively little physical effort being applied to the brake treadle to slow down or stop even a heavy car, and it permits the use of a treadle about the height of a foot accelerator, and with about the same maximum movement so that the foot can be slipped from one to the other with ease and comfort.

The accompanying drawings show one embodiment of my invention in which:

Fig. I is a side elevation showing the power brake unit and the linkage for controlled operation of the same.

Fig. II is a vertical section on the line II—II of Fig. I, on a larger scale.

In the particular form herein shown and specifically described, driving shaft A through suitable connections transmits power to the driven shaft B through the universal joint C.

The power brake unit D comprises the clutch-plate 1 attached to the end A' of the driving shaft and fitting into the clutch-housing 2, which is formed integral with the hub 3 and the cam-actuated applying-disc or flange 4. Between the disc or flange 4 and the clutch flange 2 is a pin 5 to which is attached the chain 6 which in turn is connected by a clevis 7, forming a double pivoted connection on the end of the brake power arm 8 which is attached to the transverse brake actuating bar or tube 9. The latter has the two arms 10 and 11 respectively actuating the brake pull rods or cables 12—13, connected in any usual manner for the operating of the rear and front wheel brakes.

The arms 10 and 11 are duplicated on the opposite side of the car to actuate rear and front brakes on that side.

On the side as shown, the arm 11 has an extension to which is attached a link 14, so that when the brake-actuating torque-bar is turned this link 14 will be moved longitudinally, as and for the purpose hereinafter set forth.

The power brake actuating or operating control comprises treadle 15 mounted on a pivot 16, with an arm 15ª on the opposite side of the pivot having with a pivoted connection 17 a bridle piece 18 with one end 19 connected to the link 14, and the other end 20 connected by pivot with the operating link 21. This link 21 is preferably as shown, namely, having a telescopic section with a compression spring 22, while under certain conditions it may be a fixed plain link, with its opposite end 21ª pinned to the lever 23 which actuates the yoke 24, and thereby both cams 25—25'. This lever 23 and yoke 24 are supported on the bearings 26 on a fixed portion of the transmission or engine housing, and in such a position that the cams 25—25' engage the power brake unit flange 4 at approximately diametrically opposite points, so that pressure on the cams causes a balanced pressure on the flange or cam disc 4, and thereby presses the power brake unit in a balanced manner for the proper engagement of the power brake clutch member 2, with the clutch disc 1 attached to the drive shaft section A'.

A spring or springs 27 are attached to the lever 23 tending to normally hold the lever in retarded position, thereby relieving the pressure on the power brake unit. The operating lever end of the treadle between the fulcrum 16 and the pivot 17, has a stop or abutment 28 so formed that upon relative motion with respect to the link 14 its end, where pivoted to the arm 19, will engage the abutment 28 and permit operation of the treadle to directly actuate the link 14, thereby assuring the driver having control in emergency by direct operation of the braking action, even though the connections with the power brake were interrupted or broken. Any suitable spring 29 is provided in any suitable place to retract the brake-rigging in the usual manner, and clear the brake-bands from the brake-drums. Under the conditions when link 21 or any actuating connections to the power brake are eliminated, as by accident, the position of the link 14 is shifted in view of its connection with the brake-rigging, under the effect of spring 29, so that pressure on the treadle 15 causes the engagement of the abutment 28, as shown in dotted lines in Fig. I.

In Fig. II it will be noted that the chain 6 normally leads from its pivotal connection at the bottom of the hub 3, permitting the power arm or lever 8 to drop, but when the power brake functions with forward driving the chain is pulled by the turning of the hub 3 into the dotted position 6ª, and when pulled by the initial turning of the hub 3 in the opposite direction the chain is pulled into position 6ᵇ,—in either case there is a certain amount of slack taken up which in turn moves the power brake lever 8 turning the brake-rigging torsion bar or cross rod until the slack of the brake-rigging is taken up, and when the brake connections are taut the levers 10 and 11 assume a position as shown in dotted lines 10ª and 11ª, Fig. I. In such dotted position it will be evident that arm 11 has moved the link 14, and thereby actuated the bridle 18 about the pivot 17, causing a retraction of the power brake unit actuating connections. The bridle 18, as shown in full line position, is in its initial position just before arm 11 starts to move to its dotted line position. That movement of arm 11 pulls link 14 to the right, Fig. I. Then assuming there is only gentle pressure simply holding the treadle 15, compression in spring 22 is relaxed and spring 27 retracts cam lever 23, the characteristics of these springs being readily predetermined to assure just the proper relief of cams 25 and 25' with relation to the gentle pressure and amplitude of movement or travel of the treadle. The operator feels the resultant relief to the effect on the momentum of the car, but also through the mechanism with his light foot pressure involving no preponderant muscular strain. With this "feel", which in one sense is a warning, the operator can then proceed to gently move the treadle down, motion or travel of the treadle being the operator's guide in reaching the zone of gentle pressure to further apply the power brake.

In Fig. I the dash-dot line of bridle 18 shows the abnormal condition, namely, when servo or power brake actuation is purposely eliminated, out of adjustment or broken. Thus in that position the stop or abutment 28 closer to the treadle pivot 16 than the bridle pin 17, presses the end of link 14 with increased leverage so that the force due to the operator's pressure then acts as on a pedal delivering the required braking force through link 14 to the end of lever 11, to directly actuate the brake-rigging.

The chain 6, or cable or band, will be pulled by the hub member of the power brake unit D, whether the friction on the power brake unit clutch is effected by the disc 1 on the drive shaft A' turning in either direction—forward or backward. The wrapping of the chain at its connection with the hub 3, will vary depending upon the yield in the connections transmitting the braking effort to the brake-rigging, and the intensity of braking action desired at any time. Thus, if the chain-pin connection turns more than ninety degrees the chain will tend to wrap around the hub, still maintaining the desired and uniform leverage of the radius of the hub. Thus, the force necessary to be transmitted by the power brake unit can be predetermined with respect to the proportion of parts, including the frictional area and diameter of the clutch-engaging surfaces between 1 and 2 and the co-efficient of friction of the materials used in the clutch. As shown, the disc clutch with a portion yielding, is protected by a leather cup oil-seal 2ª from any oil that may pass along the bearing of the units of the power brake D, in which the driven shaft must be free to turn at all times except when the application of the power brake unit has reached the point of bringing the car to a stop.

It will thus be seen that the operator of the car when desiring to apply the brakes of the car, applies first a gentle pressure on the treadle, with, for example, the centre of pressure as indicated by the arrow, which means a one-to-one ratio in reaction of the pivot 17. This gentle pressure gives an equal amplitude of movement to the bridle 18, and as the link 14 connections offer greater resistance, the power brake actuating link 21 is first moved as the bridle 18 pivots about its pin connection at the end of link 14, and thereby actuates the cams 25—25', creating a gentle frictional engagement of the power brake clutch, which in turn pulls the chain as shown in Fig. II, and thereby moves the power brake lever 8, which turns the brake cross rod or torque bar. As soon as the movement of the chain, taking up the slack occurs, the link 14 is moved, thereby oscillating the bridle 18 and in turn tending to release the cams 25, so that the operator immediately feels that the brake connections are beginning their action, but an appreciable further movement or travel of treadle 15 is in order to take up the motion that has been transmitted as a result of the initial tension by the power brake due to setting it in functioning position. The operator therefore has a "feel" warning him that the further displacement or travel of the treadle will begin to positively apply the cams and thereby the power brake subject, after special further displacement, to the degree of pressure by the operator. But as the ratio of the cam-toe to the operating lever 23 can be made as shown, or to meet any predetermined condition, only slight pressure on the treadle is necessary to create all the necessary effective force on flange 4, in order to create the necessary frictional engagement of a power brake clutch for the purpose of accumulating the necessary tensional force on the chain 6, in order to give the maximum desired turning-moment on the brake-rigging cross bar, or its equivalent necessary to actuate the brake-rigging and thereby the brakes of the wheels,—in this manner ease of application, that is gentle application of the power brake is assured with a sufficient amplitude of motion by the foot, or otherwise voluntarily, so that a nicety of application—or putting into functioning of the power brake is provided, and with this only a relatively slight pressure on the treadle assures the application of the brakes to any degree of brake-pull desired on the brake-rigging cables, for all required conditions of braking of the car.

To meet varying conditions in assembly or after certain degrees of wear of parts, the link 21 may be attached at different points 23ª, 23ᵇ, 23ᶜ on the lever 23, and a fineness of adjustment may also be accomplished by the telescopic connections as shown, where threaded into the link 21, or adjustments may be made with respect to the tension in the compression spring 22.

While in the form herein shown compression links or bars have been used, rearrangement or reversal of parts may be effected permitting the use of cables or tension members, if desired. The position of the various members with respect to the engine and transmission is such that all brake-operating parts are protected from any road obstructions or obstacles, being in no way liable to engagement with anything over which the engine casing and chassis cross members can safely pass,—that is the clearance is sufficient for full protection of all the mechanism involved in structural parts containing my invention.

It will be particularly noted that the results accomplished by my construction involve the initial, or the start of the setting into functioning of the power brake, and thereafter what may be called a "dwell" or a momentary release from any chance of causing fierce engagement of the power brake clutch, or any sudden application of the brakes, and thereafter assuring the requirement of the operator's further appreciable movement, having been duly warned that the functioning of the power brake is beginning, therefore providing for a cushioning effect and an easy application of the brakes,—and likewise an easy release of the brakes controlled with certainty by the "feel" of the operator.

Many variations may be made from the particular form herein shown and described, various connections between the means for setting the power brake into action may be made, the particular connections between cams and reaction flange of the power brake unit may be so fashioned as to accomplish the results,—and in many other ways my invention may be embodied for the accomplishment of the advantages herein set forth,—but what I claim and desire to secure by Letters Patent is:

1. In a brake mechanism for motor vehicles, brake-rigging, a power brake and operating means therefor having a treadle, means whereby the first movement of the treadle sets the power brake for functioning, means actuated by the initial functioning of the power brake on the brake-rigging to relieve the pressure on the treadle and the power brake setting means, and interconnections with the treadle between said two means whereby a further predetermined travel of the treadle is required to positively force the power brake into further functioning.

2. A power brake and operating mechanism for a motor car, including an actuating fulcrumed lever one end of which is subject to voluntary application of power and the other end for transmission of the actuating movement and force, the leverage of both of said arms being generally in the order of a ratio of one to one, connections from the actuating arm of the lever to set the power brake into functioning, means whereby the initial functioning of the power brake relieves the force being transmitted by the actuating arm until a further substantial travel is effected on the operating arm of the actuating lever.

3. In a brake mechanism for motor cars or the like, a treadle, a fulcrum therefor, an extension of the treadle on the other side of the fulcrum having a leverage ratio substantially equal to that of the treadle, a bridle pivoted to said treadle extension, two links attached to said bridle on opposite sides of its pivotal connection, one of said links engaging means to set a power brake into functioning, the other link having connections responsive to the movement of the brake-rigging actuating parts of the car, whereby the initial action of the power brake in taking up the slack in the brake-rigging counteracts on the bridle of the operating lever and relieves the pressure on the first link attached to the bridle until the treadle has been moved substantially further on its fulcrum.

4. A brake mechanism for motor cars including a voluntary operated treadle and brake-rigging having a power brake unit mounted for slight longitudinal movement to effect pressure between a clutch member on said unit and a frictionally-engaging member turned by the driven shaft of a car, a cam member to force said brake unit into frictional functioning, a pivoted arm to actuate said cam, a link between said arm and said voluntary operated treadle, intermediate connections between the latter and said link subject to automatic regulation by movements of the brake-rigging effected by the initial application of the power brake.

5. Brake mechanism for motor cars including a foot treadle, a power brake unit, operating mechanism, brake-rigging, means to directly actuate the brake-rigging from the power unit, an operating member between the brake-rigging and the operating mechanism normally negativing the initial effect of the power brake setting mechanism, and adapted in abnormal operation for independent actuation of the brake-rigging direct by said foot treadle.

6. In a motor car braking control mechanism, brake actuating rigging, a servo brake to operate the same, means to energize the servo brake including a member adapted for operator's movement having relatively slight travel to start the functioning of the servo brake, and means actuated by the initial movement of the brake-rigging to counteract the first travel of the operating member and its effect on the servo actuating mechanism.

7. In combination with a power brake, brake-rigging, voluntary means for setting the power brake into functioning position including cushioning means, means actuated by the initial movement of the brake-rigging to relieve the voluntary setting means coincident with relaxing of the cushioning means, said means being so constructed and arranged whereby after the initial movement of the brake-rigging the voluntary setting means is effective through the cushioning means to afford gentle control of the power brake application.

8. In combination, a brake-rigging, a power brake and operating mechanism, including a voluntary actuating lever, connections whereby the first movement of the operating lever effects an initial setting into functioning of the power brake, means automatically actuated by the brake-rigging responsive to the initial action of the power brake to relax pressure on the voluntary actuating lever and relieve the power brake action and require that the power brake then become subject to a further travel of the voluntary actuating lever.

9. A brake-operating mechanism for a motor car or the like, having brake-rigging with a torsion or cross bar 9 and a power brake unit D, means 23, 24, 25, 26 for voluntary setting the power brake unit into functioning and a power lever 8 and connections 6—7 to said brake-rigging cross bar, a voluntary actuating control lever 15ª, connections 21, 21ª, 22 from said control lever to set the power brake and control the functioning of the power brake, direct connections 14, 11, 19, from the actuating lever to said brake-rigging cross bar, said control operating lever and the direct connections and the power brake controlling connection being so constructed and arranged whereby initial action of the power brake releases the response of the actuating lever subject to further travel thereof.

10. In combination with a power brake for a power vehicle, an operating means including a voluntary control operating means, two brake-operating links, a bridle connection between said voluntary operating means and said two brake-operating links, one of said links having connections to set said power brake into functioning, the other of said links connected with members subjected to the functioning effect of the power brake and transmitting said effect to said bridle connection between the voluntary operating means and said links counter to the movement of the connections for setting the power brake.

LINDSAY H. BROWNE.